United States Patent
Cunningham et al.

(10) Patent No.: US 11,413,527 B2
(45) Date of Patent: *Aug. 16, 2022

(54) SYSTEMS AND METHODS FOR USING REPLAY ASSETS OF EXECUTABLE IN-GAME OPERATIONS TO REACH PARTICULAR GAME STATES IN AN ONLINE GAMING PLATFORM

(71) Applicant: MYTHICAL, INC., Ventura, CA (US)

(72) Inventors: Stephan Cunningham, Pasadena, CA (US); Cameron Thacker, Sherman Oaks, CA (US); John Linden, Sherman Oaks, CA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/356,466

(22) Filed: Jun. 23, 2021

(65) Prior Publication Data
US 2021/0346801 A1 Nov. 11, 2021

Related U.S. Application Data

(63) Continuation of application No. 16/710,849, filed on Dec. 11, 2019, now Pat. No. 11,077,369, which is a continuation of application No. 16/384,085, filed on Apr. 15, 2019, now Pat. No. 10,512,843.

(51) Int. Cl.
*A63F 13/00* (2014.01)
*A63F 9/24* (2006.01)
*A63F 13/497* (2014.01)
*A63F 13/71* (2014.01)

(52) U.S. Cl.
CPC ............ *A63F 13/497* (2014.09); *A63F 13/71* (2014.09)

(58) Field of Classification Search
CPC .......... A63F 13/22; A63F 13/40; A63F 13/42; A63F 13/422; A63F 13/49; A63F 13/493; A63F 13/497; A63F 13/60; A63F 13/63; A63F 13/67; A63F 13/69; A63F 13/71; A63F 13/73; A63F 13/79; A63F 13/822
See application file for complete search history.

(56) References Cited

U.S. PATENT DOCUMENTS

| | | | |
|---|---|---|---|
| 6,119,229 A | 9/2000 | Martinez | |
| 6,764,401 B1 | 7/2004 | Akatsuka | |
| 7,593,864 B2 * | 9/2009 | Shuster | G06Q 30/0601 705/26.1 |
| 8,041,614 B2 | 10/2011 | Bhogal | |
| 8,292,736 B2 | 10/2012 | Kato | |
| 9,384,067 B2 | 7/2016 | Chen | |
| 9,511,281 B1 | 12/2016 | Mclellan | |

(Continued)

*Primary Examiner* — Milap Shah
(74) *Attorney, Agent, or Firm* — Esplin & Associates, PC

(57) ABSTRACT

Systems and methods for using re-playable in-game operations to reach particular user game states in an online gaming platform are disclosed. Exemplary implementations may: manage user inventories for users of the online gaming platform; receive a request, from the first user, for activation of the replay asset by the first user; and execute the set of in-game operations automatically such that a first current user game state for the first user is advanced to a first subsequent user game state for the first user within the online gaming platform, responsive to the activation of the replay asset as requested by the first user.

16 Claims, 4 Drawing Sheets

(56) References Cited

U.S. PATENT DOCUMENTS

| | | | |
|---|---|---|---|
| 10,512,843 B1 | 12/2019 | Cunningham | |
| 11,077,369 B2 * | 8/2021 | Cunningham | ........ A63F 13/497 |
| 2002/0059120 A1 | 5/2002 | Milton | |
| 2004/0266505 A1 | 12/2004 | Keam | |
| 2006/0046839 A1 | 3/2006 | Nguyen | |
| 2006/0116194 A1 | 6/2006 | Pacey | |
| 2006/0242269 A1 | 10/2006 | Gross | |
| 2007/0105630 A1 | 5/2007 | Van Luchene | |
| 2009/0201299 A1 | 8/2009 | Bhogal | |
| 2009/0204628 A1 | 8/2009 | Bhogal | |
| 2009/0287707 A1 | 11/2009 | Lyle | |
| 2009/0312080 A1 | 12/2009 | Hamilton, II | |
| 2010/0041470 A1 | 2/2010 | Preisach | |
| 2010/0280919 A1 | 11/2010 | Everett | |
| 2011/0009192 A1 | 1/2011 | Aronzon | |
| 2011/0021269 A1 | 1/2011 | Wolff-Peterson | |
| 2011/0124415 A1 | 5/2011 | Shimono | |
| 2011/0172007 A1 | 7/2011 | Sulyok | |
| 2012/0244945 A1 | 9/2012 | Kolo | |
| 2012/0283019 A1 | 11/2012 | Veprinsky | |
| 2013/0059663 A1 | 3/2013 | Kurlancheek | |
| 2013/0130797 A1 | 5/2013 | Stone | |
| 2013/0143670 A1 * | 6/2013 | Junkin | ............... G06Q 30/0283 |
| | | | 463/42 |
| 2013/0190096 A1 | 7/2013 | Ronen | |
| 2014/0206452 A1 | 7/2014 | Bambino | |
| 2015/0099575 A1 | 4/2015 | Elias | |
| 2016/0107087 A1 | 4/2016 | Miura | |
| 2019/0130701 A1 | 5/2019 | Simons | |
| 2019/0192978 A1 | 6/2019 | Eatedali | |
| 2020/0324201 A1 | 10/2020 | Cunningham | |

\* cited by examiner

SYSTEMS AND METHODS FOR USING REPLAY ASSETS OF EXECUTABLE IN-GAME OPERATIONS TO REACH PARTICULAR GAME STATES IN AN ONLINE GAMING PLATFORM

FIELD OF THE DISCLOSURE

The present disclosure relates to systems and methods for using re-playable in-game operations to reach particular user game states in an online gaming platform.

BACKGROUND

Online gaming platforms are known. Selling, trading, and transferring digital in-game assets to the users of online gaming platforms is known. Transferring in-game virtual items between users of online gaming platforms is known.

SUMMARY

One aspect of the present disclosure relates to a system configured for using re-playable in-game operations to reach particular user game states in an online gaming platform. The system may include one or more hardware processors configured by machine-readable instructions. The processor(s) may be configured to manage user inventories for users of the online gaming platform. The users may include a creating user, a first user, and/or other users. The user inventories may include a creating user inventory associated with the creating user, a first user inventory associated with the first user, and so forth. The creating user inventory may include a replay asset that includes and/or refers to a set of in-game operations. The set of in-game operations may be provided by the creating user, and/or by other providers. Activation of the replay asset by a particular user within the online gaming platform results in automated execution of the set of in-game operations on behalf of the particular user such that a particular current user game state for the particular user may be advanced to a particular subsequent user game state for the particular user. The activation may require ownership of usage rights pertaining to the replay asset. The processor(s) may be configured to receive a request, from the first user, for activation of the replay asset by the first user. The activation of the replay asset by the first user may result in automated execution of the set of in-game operations on behalf of the first user. The processor(s) may be configured to execute the set of in-game operations automatically such that a first current user game state for the first user is advanced to a first subsequent user game state for the first user within the online gaming platform, responsive to the activation of the replay asset as requested by the first user.

Another aspect of the present disclosure relates to a method for using re-playable in-game operations to reach particular user game states in an online gaming platform. The method may include managing user inventories for users of the online gaming platform. The users may include a creating user, a first user, and/or other users. The user inventories may include a creating user inventory associated with the creating user, a first user inventory associated with the first user, and so forth. The creating user inventory may include a replay asset that includes and/or refers to a set of in-game operations. The set of in-game operations may be provided by the creating user, and/or by other providers. Activation of the replay asset by a particular user within the online gaming platform results in automated execution of the set of in-game operations on behalf of the particular user such that a particular current user game state for the particular user may be advanced to a particular subsequent user game state for the particular user. The activation may require ownership of usage rights pertaining to the replay asset. The method may include receiving a request, from the first user, for activation of the replay asset by the first user. The activation of the replay asset by the first user may result in automated execution of the set of in-game operations on behalf of the first user. The method may include executing the set of in-game operations automatically such that a first current user game state for the first user is advanced to a first subsequent user game state for the first user within the online gaming platform, responsive to the activation of the replay asset as requested by the first user.

As used herein, any association (or relation, or reflection, or indication, or correspondency) involving servers, processors, client computing platforms, assets, instructions, operations, user game states, steps, ownership, requests, verifications, sales, transfers, notifications, blockchains, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
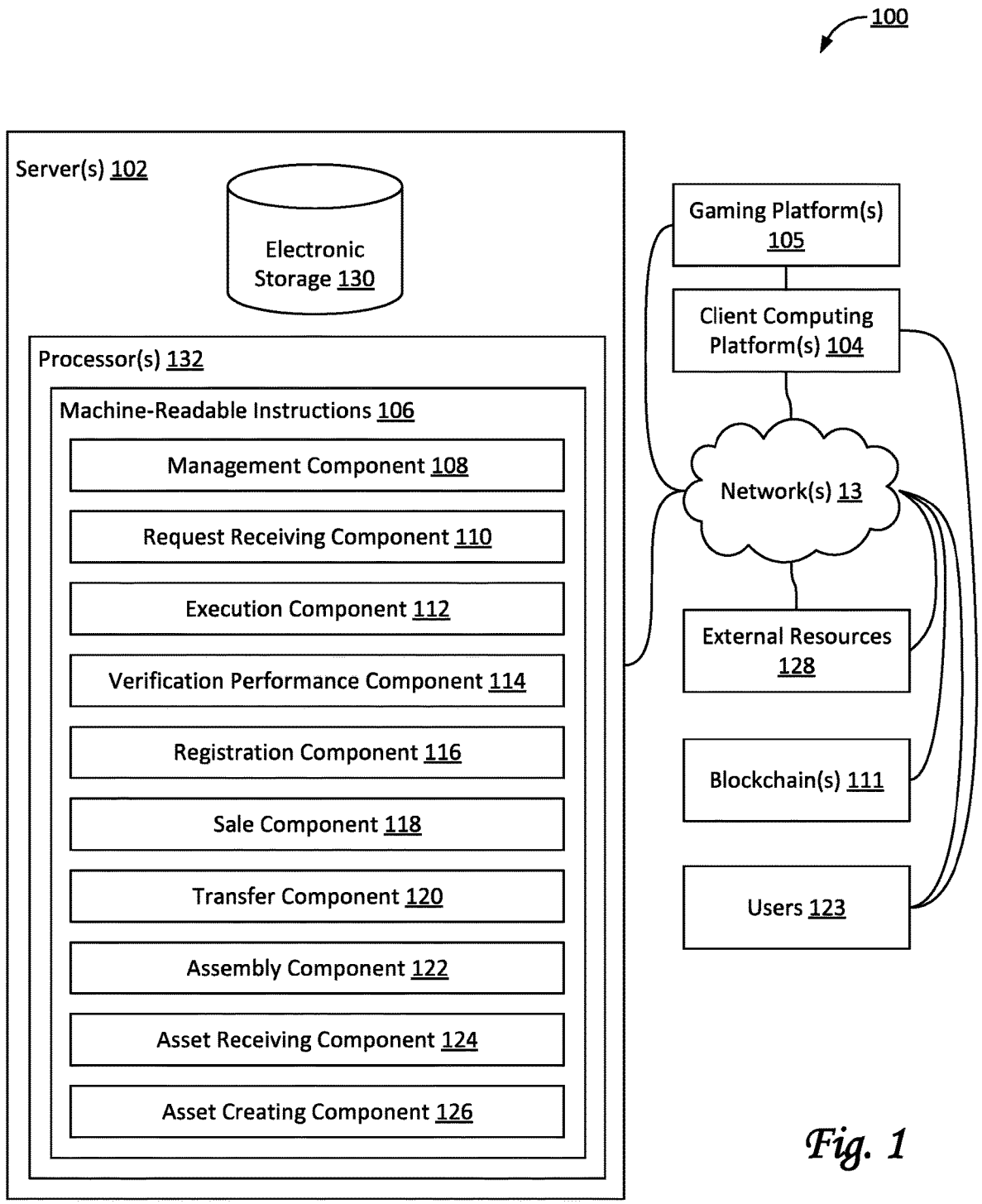
FIG. 1 illustrates a system configured for using re-playable in-game operations to reach particular user game states in an online gaming platform, in accordance with one or more implementations.

FIG. 1 illustrates a system 100 configured for using re-playable in-game operations to reach particular user game states in one or more gaming platforms 105 (e.g., an online gaming platform), in accordance with one or more implementations. In some implementations, system 100 may include one or more of electronic storage 130, one or more servers 102, one or more client computing platforms 104, one or more gaming platforms 105, one or more blockchains 111 (e.g., a distributed blockchain), one or more external resources 128, and/or other components.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 123 may access system 100 via client computing platform(s) 104. Users 123 may include one or more of a first user, a second user, a third user, a fourth user, and/or other users. In some implementations, users 123 may include one or more creating users, requesting users, selling users, buying users, owning users, and/or other users. In some implementations, one or more users 123 do not need to be players of any gaming platform.

In some implementations, system 100 and/or servers 102 may be configured to communicate with one or more of (online) gaming platform(s) 105, users 123, blockchain(s) 111, and/or other components. As used herein, gaming platform 105 may refer to either an individual game, a type of gaming console and its ecosystem, and/or both. Gaming platform 105 may be operated, hosted, and/or owned by a stakeholder of gaming platform 105. Users 123 may include players who play on gaming platform 105. In some implementations, gaming platform 105 may include an online store that sells and/or otherwise transfers (in-game) virtual items that may be used within gaming platform 105.

As used herein, the term "game state" may refer to some or all of the variables that define the progress and/or status of a player and/or the player's account within an online gaming platform, e.g., gaming platform 105. For example, in some implementations, users may save the current game state to preserve their progress, and load the saved game state at a future time to restore their progress and/or status as if they had taken no actions after the moment of saving their game state. For example, whatever items or health were lost after the moment of saving the game state would be restored upon loading the saved game state. In some implementations, users may save and/or restore game state at particular save points and/or restore points. In some implementations, save points and/or restore points may be specific locations within a virtual space of an online game such as, for example, the beginning of a level, mission, and/or battle.

As used herein, the term "user game state" may refer to some or all of the variables that define the position of the user (or a user-controlled character) at a particular moment within an online gaming platform (e.g., gaming platform 105), such as a location within a virtual space of an online game. The user game state at the current time may be referred to as the current user game state. In some implementations, a current position may include a heading and/or direction of the user or the user-controlled character. In some implementations, a current position may include the posture of the user-controlled character, such as, e.g., laying down, sitting, standing, etc. In some implementations, a current position may include the position of one or more body parts of the user and/or the user-controlled character, such as, e.g., the position of feet, legs, arms, wings, etc. In some implementations, a current position may include a velocity and/or acceleration of the user or the user-controlled character.

An in-game action or operation taken and/or performed by an individual user may advance the current user game state of the individual user to a subsequent user game state of the individual user. For example, a particular user-controlled character controlled by an individual user may be at a location with coordinates $(X_0, Y_0)$ within a virtual space. This location may be part of the current user game state of the individual user and/or the particular user-controlled character. By taking a step in a particular direction, the subsequent user game state of the individual user and/or the particular user-controlled character may include, define, and/or otherwise be associated with a subsequent location having coordinates $(X_1, Y_1)$ within the virtual space. Next, by taking another step in a particular direction, the next user game state may be associated with the next location having coordinates $(X_1, Y_2)$ within the virtual space. Individual user game states may be associated with one or more types of different timing information. For example, the user game state associated with coordinates $(X_0, Y_0)$ may be associated with a timestamp of t=0, the user game state associated with coordinates $(X_1, Y_1)$ may be associated with a timestamp of t=1, the user game state associated with coordinates $(X_1, Y_2)$ may be associated with a timestamp of t=2, and so forth. In some implementations, timestamps do not need to increment by the same amount. For example, if the individual user had waited to the take the next step described above, the user game state associated with coordinates $(X_1, Y_2)$ may have been associated with a timestamp of t=5.

In some implementations, system 100 and/or one or more components of system 100 may be configured to execute an instance of a game (e.g., an online game) to facilitate presentation of the game to users 123, and/or to implement in-game actions in the instance of the game, e.g., in response to action requests for the in-game actions by users 123. The game may be provided via a virtual space, and may include a plurality of resource types and/or maps. An instance of the virtual space may be executed by one or more computer components to determine views of the virtual space. In some implementations, the view may be communicated (e.g., by streaming, via object/position data, and/or other information) from server(s) 102 and/or other sources to client computing platforms 104 for presentation to users 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by a user.

The instance of the virtual space may include a simulated space that is accessible by users 123 by clients (e.g., client computing platforms 104) that present the views of the virtual space to a user. The simulated space may have a topography, express ongoing real-time interaction by one or more users, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the virtual space, users 123 may control characters, objects, simulated physical phenomena, and/or other elements within the virtual space to interact with the virtual space and/or each other. The user characters may include avatars. As used herein, the term "user character" may refer to an object or group of objects present in the virtual space, that correspond(s) to an individual user. A particular user character may be controlled by the particular user with which it is associated. Such user characters may be referred to as user-controlled characters. User-controlled element(s) may move through and interact with the virtual space (e.g., non-user characters in the virtual space, other objects in the virtual space, etc.). User-controlled elements controlled by and/or associated with a given user may be created and/or customized by the given user. Individual users may have an "inventory" of virtual goods and currency (e.g., resources of the plurality of resource types) that the individual user can use (e.g., by manipulation of a user character and/or other user-controlled elements) and/or other items, to perform in-game actions within the virtual space.

In some implementations, a distributed blockchain such as blockchain 111 may be maintained by a distributed computing platform (not shown in FIG. 1). In some implementations, the distributed computing platform may be implemented by a set of client computing platforms and/or servers. The distributed computing platform may support a virtual machine (not shown in FIG. 1). The distributed computing platform and/or the virtual machine may form a runtime environment for smart contracts and/or other executable code. In some implementations, the distributed computing platform may include electronic storage configured to store part or all of blockchain(s) 111. The smart contracts may be stored on blockchain(s) 111. In some implementations, the distributed computing platform may be the EOSIO platform. In some implementations, the distributed computing platform may be Ethereum. In some implementations, the virtual machine may be a Turing-complete and decentralized virtual machine.

A distributed blockchain may act as a (decentralized) database that stores a registry of assets and transactions across one or more networks. A given asset may be owned by a particular user. An asset may include anything of material value or usefulness that is owned by or on behalf of a person or company, including but not limited to assets created by asset creating component 128, and/or other assets. In some implementations, a right pertaining to an object may be an asset, the object being a physical or a virtual item. Multiple rights may form a set of rights or a bundle of rights that may be transferred and/or otherwise acted on or operated on together. For example, rights may include a right to use, a right to sell, a right to destroy, and/or other rights.

In some implementations, tokens may be a type of asset. In some implementations, tokens may include one or more of security tokens, utility tokens, payment tokens, initial coin offering (ICO) tokens, virtual currency tokens, crypto tokens, ERC-20 tokens, EOS tokens, and/or other tokens. In some implementations, tokens not only represent value, but may have a specific use in a particular distributed computing platform, e.g., in the operation of blockchain 111.

In some implementations, blockchain(s) 111 may record and/or register ownership of assets. Alternatively, and/or simultaneously, blockchain(s) 111 may register transactions that modify ownership of assets. A smart contract may be a type of asset. In some implementations, once a smart contract has been added to a blockchain, the smart contract may be referred to as published, posted, registered, and/or recorded. Elements of blockchain(s) 111 may be grouped together in units that are referred to as blocks. For example, an individual block may include one or more assets and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more assets, one or more transactions, and/or other information.

Blockchain(s) 111 may be publicly accessible and append-only. In some implementations, existing blocks of a distributed blockchain can substantially not be altered or deleted, unless multiple copies of the distributed blockchain are altered. This is unlikely to happen provided that multiple copies of the distributed blockchain are stored on different computing platforms, e.g., in different geographical locations. The distributed blockchain may be replicated on multiple computing platforms, preferably in multiple different geographical locations.

Server(s) 102 may be configured by machine-readable instructions 106. Machine-readable instructions 106 may include one or more instruction components. The instruction components may include computer program components. The instruction components may include one or more of management component 108, request receiving component 110, execution component 112, verification performance component 114, registration component 116, sale component 118, transfer component 120, assembly component 122, asset receiving component 124, asset creating component 126, and/or other instruction components.

Management component 108 may be configured to manage user inventories for users 123 of online gaming platform 105. Users 123 may include a first user, a second user, a third user, and so forth. In some implementations, users 123 may include a creating user and/or other users. The user inventories may include a first user inventory associated with the first user, a second user inventory associated with the second user, a creating user inventory associated with the creating user, and so forth. In some implementations, a particular user inventory may include a particular virtual good and/or virtual item referred to as a replay asset.

Replay assets may include and/or refer to sets of in-game operations. For example, a particular replay asset may include a particular set of in-game operations. In some implementations, a set of in-game operations may be provided by the creating user, and/or by other providers. For example, in some implementations, a set of in-game operations may be provided by a stakeholder of gaming platform 105. Activation of a particular replay asset by a particular user within gaming platform 105 may result in automated execution of the particular set of in-game operations on behalf of the particular user. For example, activation of the particular replay asset by the particular user within gaming platform 105 may result in automated execution of the particular set of in-game operations on behalf of the particular user such that a particular user game state (e.g., the current user game state) for the particular user may be advanced to a particular subsequent user game state for the particular user. In some implementations, individual in-game operations may correspond to user-performed actions, including but not limited to user-performed movement, user-performed selections, user-performed waiting periods, and/or other actions performed by users. In some implementations, activation may require ownership of one or more rights pertaining to a particular replay asset, including but not limited to usage rights and/or ownership rights.

Figure 3A:
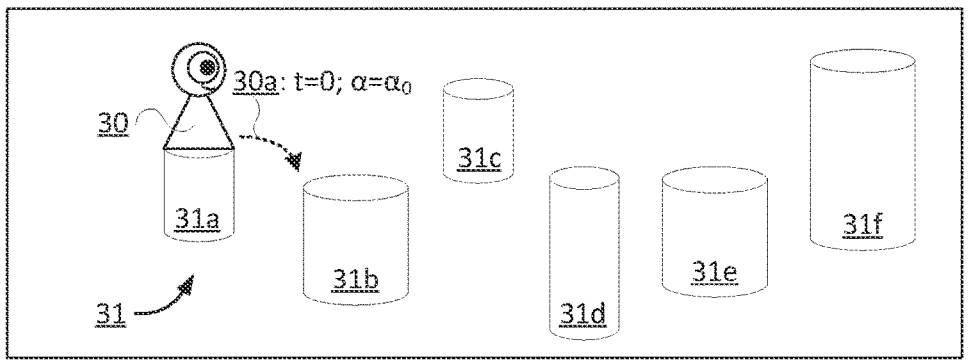
FIGS. 3A-3B illustrate a sequence of in-game operations that may be replayed by another user controlling another character, as may be used a system configured for using re-playable in-game operations to reach particular user game states in an online gaming platform, in accordance with one or more implementations.

By way of non-limiting example, FIG. 3A illustrates an in-game operation 30*a* that may be performed by in-game character 30 in a topography 31 that includes a set of objects, the set of objects including a first object 31*a*, a second object 31*b*, a third object 31*c*, a fourth object 31*d*, a fifth object 31*e*, and a sixth object 31*f*. In-game operation 30*a* may be replayed by another user controlling another character, as described in this disclosure. As depicted, in-game character may be located on top of first object 31*a* prior to performing in-game operation 30*a*. In-game operation 30*a* may be associated with timing information, such as a timestamp (here, the timestamp is t=0). In-game operation 30*a* may include a particular movement (for example a jump) in a particular heading "a" (for example heading $\alpha_0$). In some implementations, in-game operation 30*a* may include a separate step of positioning in-game character according to heading $\alpha_0$, i.e., facing in that direction. In some implementations, in-game operation 30*a* may define the particular movement in a manner that includes the heading information. For example, the result of performing in-game operation may be that in-game character 30 is located on top of second object 31*b* (shown in FIG. 3B). Performing the wrong movement, or performing the movement in the wrong direction may result in in-game character 30 being located elsewhere than on top of second object 31*b*, such as near the bottom of second object 31*b*, which may result in an immediate and fiery death of in-game character 30 (this is not shown).

Figure 3B:
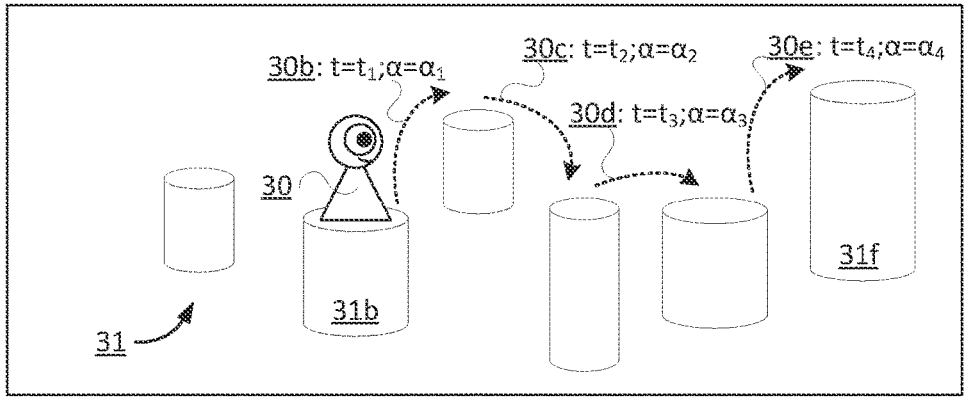

By way of non-limiting example, FIG. 3B illustrates a set of in-game operations that may be performed by in-game character 30 in topography 31. The set of in-game operations may follow in-game operation 30*a* depicted in FIG. 3A. The set of in-game operations in FIG. 3B may include an in-game operation 30*b* (associated with timestamp t=$t_1$ and heading $\alpha=\alpha_1$), an in-game operation 30*c* (associated with timestamp t=$t_2$ and heading $\alpha=\alpha_2$), an in-game operation 30*d* (associated with timestamp t=$t_3$ and heading $\alpha=\alpha_3$), and an in-game operation 30*e* (associated with timestamp t=$t_4$ and heading $\alpha=\alpha_4$). A set of in-game operations may form a sequence of in-game operations. The result of performing the set of in-game operations in FIG. 3B may be that in-game character 30 is sequentially positioned on the tops of objects in topography 31, ending on top of sixth object 31*f* (in-game character 30 in end-position not shown in FIG. 3B). In some cases, the timing of certain operations may matter. For example, in-game character 30 may need to wait and/or duck to avoid a threat or hazard at some point, before proceeding with the next in-game operation in a set of in-game operations.

Referring to FIG. 1, executing a set of in-game operations automatically may include performing, during an automation period, particular in-game actions and/or in-game operations within gaming platform 105 by a particular in-game character associated with a particular user (such as a user character). The particular user may have control over other in-game actions and/or in-game operations performed by the in-game character before and after the automation period. For example, the particular in-game character may be a user-controlled character that is controlled by the particular user before and after the automation period. During the automation period, system 100 may control the same character such that the particular user at least temporarily does not control the same character. In some implementations, the particular user temporarily yields control over the character, e.g., until completion of the automation period. In some implementations, the automation period may span the period from the first timestamp in the set of in-game operations to the last timestamp in the set of in-game operations. For example, assuming a particular set of in-game operations includes the in-game operations described in relation to FIGS. 3A-3B, the automation period associated with the particular set of in-game operations may span the period from t=0 to t=$t_4$, during which time in-game character 30 moves from the top of first object 31*a* to the top of sixth object 31*f*.

Referring to FIG. 1, in some implementations, executing a particular set of in-game operations automatically may occur responsive to a verification verifying a particular user has ownership of, e.g., the usage rights pertaining to the particular replay asset.

Request receiving component 110 may be configured to receive requests from users for activations of replay assets. Activation of a replay asset by a particular user may result in automated execution of the corresponding set of in-game operations on behalf of the particular user. In some implementations, a particular user may request activation of a replay asset for another user.

Execution component 112 may be configured to execute sets of in-game operations, e.g., as requested through requests received by request receiving component 110. In some implementations, execution component 112 may be configured to execute sets of in-game operations automatically responsive to activations of replay assets. In some implementations, execution component 112 may be configured to execute sets of in-game operations automatically such that a particular user game state for a particular user is advanced to a particular subsequent user game state.

Verification performance component 114 may be configured to perform verifications pertaining to the use and/or activation of replay assets. For example, verification performance component 114 may be configured to perform a verification whether a particular user has the ownership of the usage rights pertaining to a particular replay asset. In some implementations, one or more verifications may be required prior to execution by execution component 112. In some implementations, an implementation of a verification may be based on how the replay assets are stored and/or traded. For example, in some implementations, if replay assets are managed in user inventories within gaming platform 105, a verification of ownership may be implemented as a verification that a particular replay asset is included in a particular user inventory. For example, in some implementations, if replay assets are licensed by a creating user to other users, a verification of ownership of usage rights may be implemented as a verification that a particular replay asset is licensed to the particular user requesting its activation. For example, in some implementations, if ownership of replay assets is recorded within blockchain 111, a verification of ownership may be implemented as a verification that a particular replay asset includes a particular user's address as its ownership address. For example, in some implementations, if replay assets are licensed by a creating user to other users through blockchain 111, a verification of ownership of usage rights may be implemented as a verification that a particular replay asset is licensed to the particular user requesting its activation, e.g. by verifying the particular replay asset includes the particular user's address as one of its licensee addresses.

Registration component 116 may be configured to register assets, including but not limited to replay assets, on a distributed blockchain, including but not limited to blockchain 111. Individual replay assets may be associated with an individual address of a user that has ownership of the usage rights pertaining to the individual replay asset. In some implementations, a verification by verification performance component 114 may include a verification whether the individual address associated with an individual replay asset is owned by the particular user attempting to activate the particular individual replay asset. In some implementations, a transfer of the ownership of the usage rights pertaining to a particular replay asset may include a transaction that is registered on blockchain 111 and/or a change of the individual address associated with the particular replay asset.

Figure 4A:
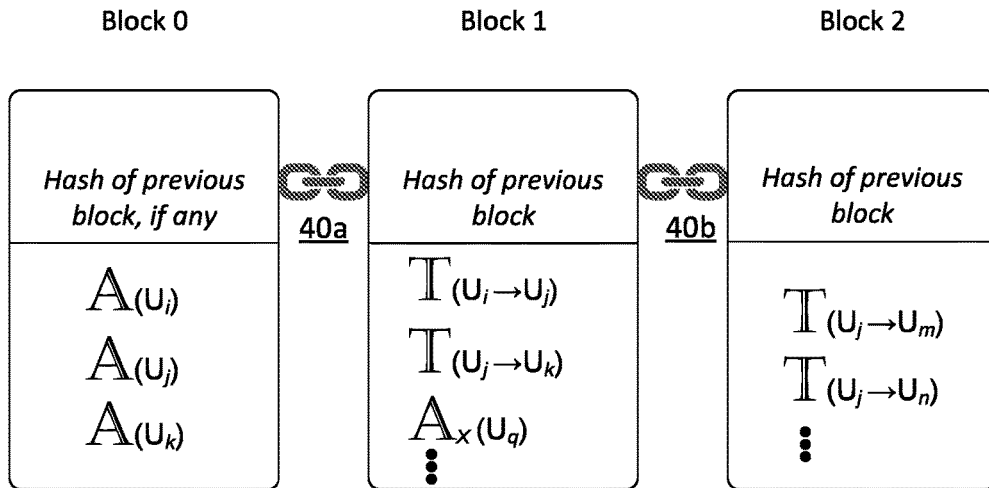
FIGS. 4A-4B illustrate exemplary blockchains as may be used by a system configured for using re-playable in-game operations to reach particular user game states in an online gaming platform, in accordance with one or more implementations.

By way of non-limiting example, FIG. 4A illustrates a blockchain 111a that implements a blockchain including a block 0, a block 1, and a block 2. As time progresses, more blocks may be added to blockchain 111a. The blocks within blockchain 111a are ordered. In block 0, three assets (indicated by a capital "A") are generated and/or assigned to three users or participants: a first asset is assigned to user i (Ui), a second asset is assigned to user j (Uj), and a third asset is assigned to user k (Uk). These assets may be individual tokens manifested, deployed, and/or instantiated through an asset creating component similar to asset creating component 108 (see FIG. 1). Block 1 is connected to block 0 (as indicated by a link 40a), for example by including an address of block 1 in block 0, or vice versa. Likewise, block 1 is connected to block 2, as indicated by a link 40b.

In block 1, one asset (labeled Ax) is generated and/or assigned to user q (Uq), for example by associating an address of user q to asset Ax. For example, the asset in block 1 may be an individual replay asset created by an asset creating component similar to asset creating component 126 (see FIG. 1). Replay asset Ax may include and/or refer to a set of in-game operations that are replayable in gaming platform 105 (not shown). Additionally, block 1 includes two transactions (indicated by a capital "T"): a first transaction from user i to user j, and a second transaction from user j to user k. Block 2 includes a first transaction from user j to user m, and a second transaction from user j to user n. In some implementations, based on the contents of the blocks, any user of blockchain 111a may determine the current assets of blockchain 111a, and the balances of any user. In some implementations, the balance of a particular user may be verified prior to adding a transaction that reduces that particular user's balance. For example, an individual user may not be allowed to transfer assets the individual user does not own.

Figure 4B:
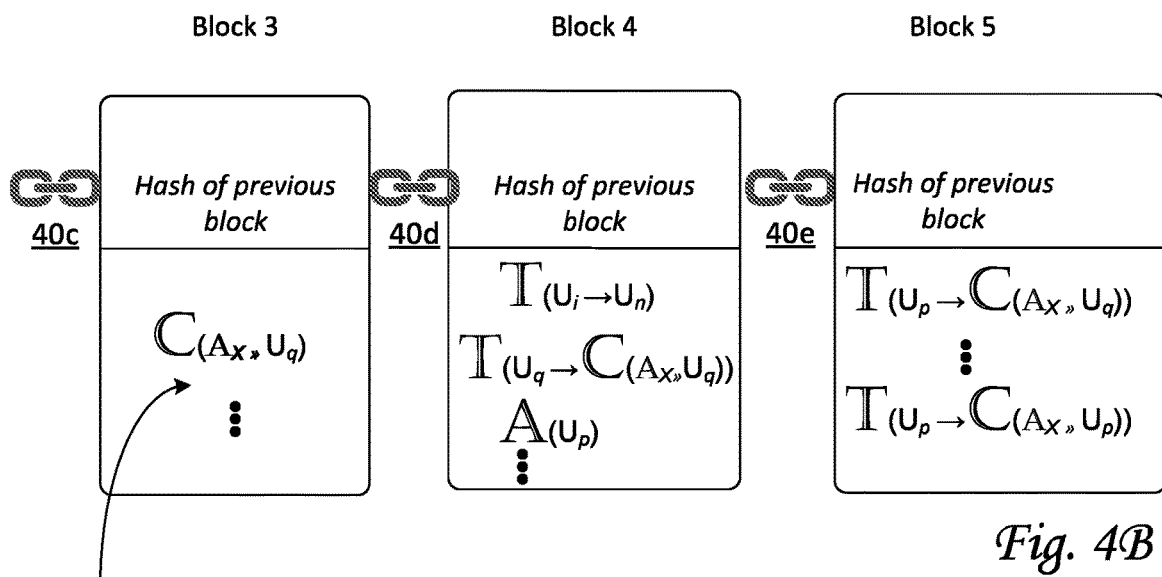

By way of non-limiting example, FIG. 4B illustrates a blockchain 111b that includes the same blocks as blockchain 111a of FIG. 4A, plus additional blocks (block 3, block 4, block 5) that have been appended to the blockchain. Block 3 may be connected to block 2 (as indicated by a link 40c), block 4 may be connected to block 3 (as indicated by a link 40d), and block 5 may be connected to block 4 (as indicated by a link 40e). In block 3, a smart contract 41 (indicated by a capital "C") is posted. For example, smart contract 41 may have been generated to implement a way to license usage of replay asset Ax to other users. In FIG. 4B, a function call to a function defined by smart contract 41 (e.g., to request activation of replay asset Ax) may be depicted and/or implemented as a transaction (e.g., the function may be invoked in exchange for consideration). Smart contract 41 may have been posted to blockchain 111b by a component similar to registration component 116 (shown in FIG. 1). Referring to FIG. 4B, for example, smart contract 41 may include or refer to replay asset Ax and record that replay asset Ax is currently owned by user q (Uq). In block 4, one asset is generated and/or assigned to user p (Up). Additionally, block 4 includes a transaction (indicated by a capital "T"): a transaction from user i to user n. For example, the transaction may represent a purchase of a first virtual item by user n. Additionally, block 4 includes a transaction from user q to the same smart contract as depicted in block 3. For example, the transaction may represent user q requesting an activation of replay asset Ax in accordance with the set of in-game instructions included in replay asset Ax. Block 5 includes two transactions (indicated by a capital "T"): a first transaction of ownership of smart contract 41 from old owner user q to new owner user p, and a second transaction may represent user p requesting another activation of replay asset Ax in accordance with the set of in-game instructions included in replay asset Ax. For example, the first activation (responsive to the transaction in block 4) may operate on an in-game character controlled by user q. For example, the second activation (responsive to the transaction in block 5) may operate on an in-game character controlled by user p.

Referring to FIG. 1, sale component 118 may be configured to receive information reflecting sales of assets, including but not limited to sales of replay assets. For example, sale component 118 may be configured to receive information reflecting the sale of a particular replay asset from a first user to a second user, or from an online store to a purchasing user. In some implementations, response to such a sale, the particular replay asset may have been added to the second user inventory associated with the second user. Execution performance component 120 may be configured to perform automated execution of the particular set of in-game operations (corresponding to the particular replay asset that has been sold by the first user to the second user) such that a current user game state for the second user is advanced to a subsequent user game state for the second user within gaming platform 105, responsive to a request by the second user to activate the particular replay asset. In some implementations, completion of a sale of a replay asset (e.g., from a creating user to a purchasing user, or from gaming platform 105 to a purchasing user) may be conditioned on the purchasing user achieving a measurable goal through activation of the particular replay asset. For example, if the purchasing user fails to reach the particular location as intended by activating the particular replay asset, the sale may be reverted and/or otherwise canceled.

Figure 3C:
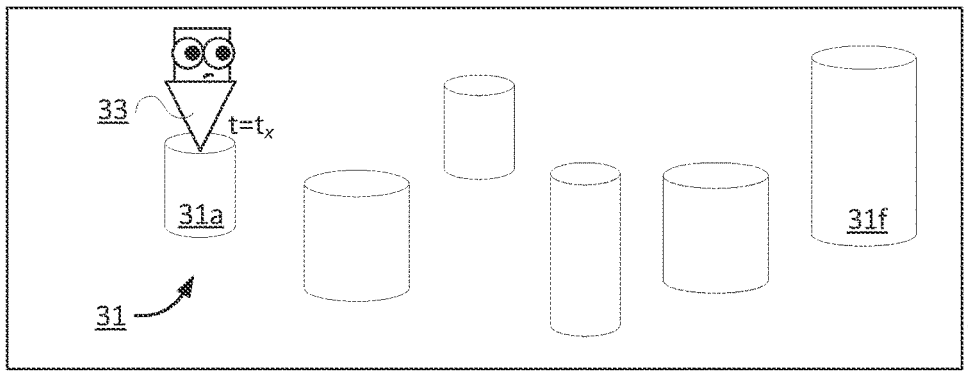
FIGS. 3C-3D illustrate a sequence of in-game operations that are replayed by a user controlling a character, as may be used a system configured for using re-playable in-game operations to reach particular user game states in an online gaming platform, in accordance with one or more implementations.
Figure 3D:
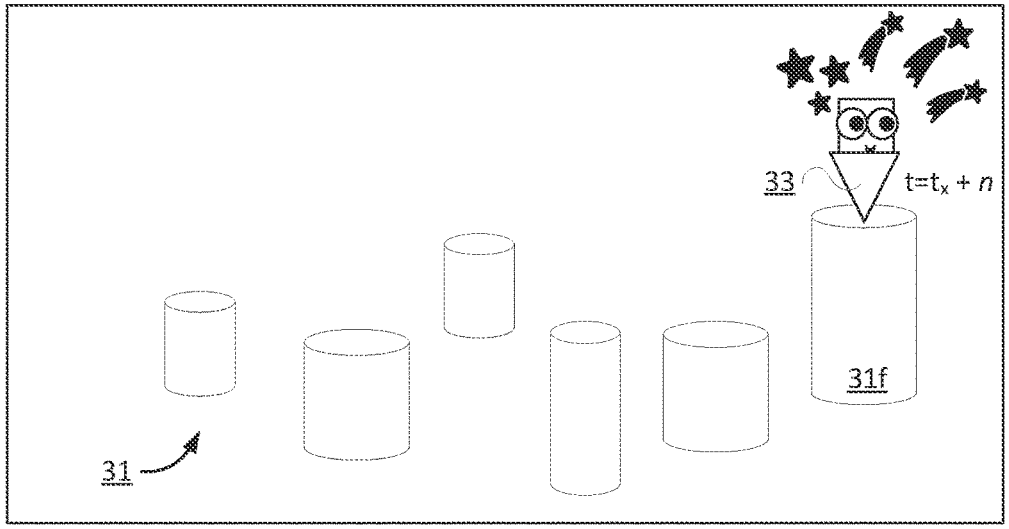

By way of non-limiting example, FIGS. 3C-3D illustrate a sequence of in-game operations that are replayed by a particular user controlling a particular in-game character 33.

As depicted, in-game character 33 is located in the same topography 31 as shown in FIG. 3A, on the top of first object 31a, at a time referred to with timestamp $t=t_x$. The current user game state for the second user includes in-game character 33 being located on the top of first object 31a. Assume in-game character 33 is controlled by a second user who wishes to reach the top of sixth object 31f with in-game character 33. Perhaps the second user is having trouble reaching this goal manually, by directly and personally controlling the movement of in-game character 33. Assume the second user who has purchased a particular replay asset that includes the set of in-game operations described in relation to FIGS. 3A-3B. Upon a request by the second user to activate the particular replay asset, a particular set of in-game operations is executed automatically on behalf of the second user such that the current user game state for the second user is advanced to a subsequent user game state as shown in FIG. 3D, where in-game character has reached the top of sixth object 31f. Intermediate steps and/or moments between FIG. 3C and FIG. 3D may or may not be shown to the second user. Automatic execution of the particular set of in-game operations may occur during an automation period that spans from timestamp $t=t_x$ to timestamp $t=t_x+n$, where n correspond to a combination of the number of movements, operations, and wait periods included in the particular set of in-game operations. After this automation period, control of in-game character 33 may be returned to the second user.

Assembly component 122 may be configured to create sets of in-game operations by users 123, including but not limited to the creating user. For example, the creating user may record a sequence of in-game operations in real-time, as the creating user performs the in-game operations using a particular user character that is controlled by the creating user. In some implementations, assembly component 122 may be configured to allow editing and/or modification of sets of in-game operations, for example through an editor interface. For example, a creating user may modify a recorded sequence of in-game operations to facilitate future replay by himself and/or other users. In some implementations, assembly component 122 may be configured to allow editing and/or modification of purchased sets of in-game operations. For example, a purchasing user of a purchased replay asset may modify the sequence of in-game operations to facilitate future replay by himself and/or other users, and/or improve the replay asset. In some implementations, the purchasing user may be able to sell the modified replay asset to other users.

Asset receiving component 124 may be configured to receive sets of in-game operations from users 123, including but not limited to the creating user, other users, and/or stakeholders of gaming platform 105.

Asset creating component 126 may be configured to create replay assets. In some implementations, asset creating component 126 may be configured to create replay assets such that the created replay assets include and/or refer to received sets of in-game operations (e.g., received through asset receiving component 124). In some implementations, assets including replay assets may be created by and/or within gaming platform 105. For example, in some implementations, as an in-game challenge is designed, a corresponding asset to meet that challenge may be created.

In some implementations, server(s) 102, client computing platform(s) 104, and/or external resources 128 may be operatively linked via one or more electronic communication links. For example, such electronic communication links may be established, at least in part, via one or more networks 13, including but not limited to the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include one or more processors configured to execute computer program components. The computer program components may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a smart watch, a gaming console, and/or other computing platforms.

External resources 128 may include sources of information outside of system 100, external entities participating with system 100, and/or other resources. In some implementations, some or all of the functionality attributed herein to external resources 128 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, 124, and/or 126, and/or other components. Processor(s) 132 may be configured to execute components 108, 110, 112, 114, 116, 118, 120, 122, 124, and/or 126, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, and/or 126 are illustrated in FIG. 1 as being implemented within a single processing unit, in implementations in which processor(s) 132 includes multiple processing units, one or more of components 108, 110, 112, 114, 116, 118, 120, 122, 124, and/or 126 may be implemented remotely from the other components. The description of the functionality provided by the different components 108, 110, 112, 114, 116, 118, 120, 122, 124, and/or 126 described below is for illustrative purposes, and is not intended to be limiting, as any of components 108, 110, 112, 114, 116, 118, 120, 122, 124, and/or 126 may provide more or less functionality than is described. For example, one or more of components 108, 110, 112, 114, 116, 118, 120, 122, 124, and/or 126 may be eliminated, and some or all of its functionality may be provided by other ones of components 108, 110, 112, 114, 116, 118, 120, 122, 124, and/or 126. As another example, processor(s) 132 may be configured to execute one or more additional components that may perform some or all of the functionality attributed below to one of components 108, 110, 112, 114, 116, 118, 120, 122, 124, and/or 126.

Figure 2:
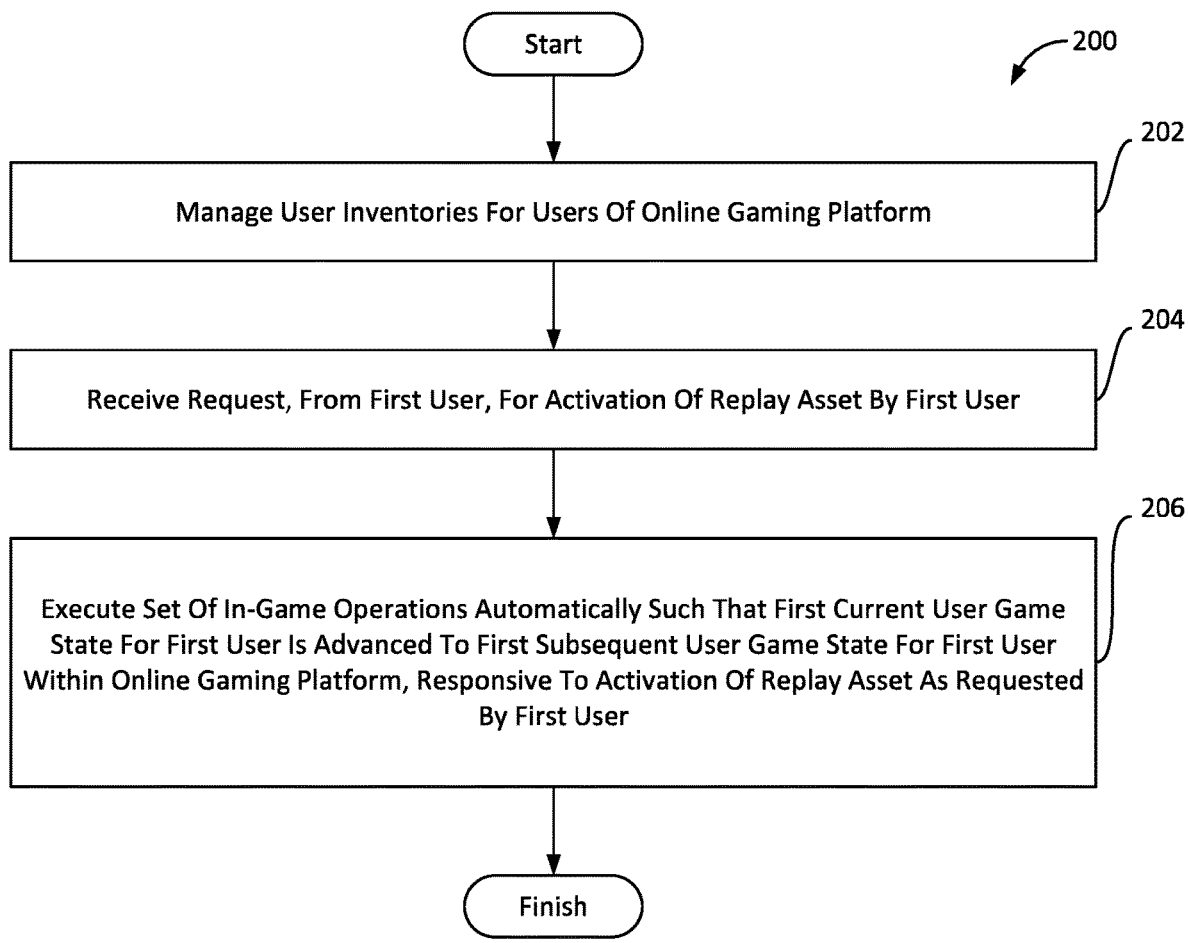
FIG. 2 illustrates a method for using re-playable in-game operations to reach particular user game states in an online gaming platform, in accordance with one or more implementations.

FIG. 2 illustrates a method 200 for using re-playable in-game operations to reach particular user game states in an online gaming platform, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include managing user inventories for users of the online gaming platform. The users may include a creating user and a first user. The user inventories may include a creating user inventory associated with the creating user and a first user inventory associated with the first user. The creating user inventory may include a replay asset that includes and/or refers to a set of in-game operations. The set of in-game operations may be provided by the creating user. Activation of the replay asset by a particular user within the online gaming platform results in automated execution of the set of in-game operations on behalf of the particular user such that a particular current user game state for the particular user may be advanced to a particular subsequent user game state for the particular user. The activation may require ownership of usage rights pertaining to the replay asset. Operation 202 may be performed by one or more hardware processors configured by machine-readable instructions including a component that is the same as or similar to management component 108, in accordance with one or more implementations.

An operation 204 may include receiving a request, from the first user, for activation of the replay asset by the first user. The activation of the replay asset by the first user may result in automated execution of the set of in-game operations on behalf of the first user. Operation 204 may be performed by one or more hardware processors configured by machine-readable instructions including a component that is the same as or similar to request receiving component 110, in accordance with one or more implementations.

An operation 206 may include executing the set of in-game operations automatically such that a first current user game state for the first user is advanced to a first subsequent user game state for the first user within the online gaming platform, responsive to the activation of the replay asset as requested by the first user. Operation 206 may be performed by one or more hardware processors configured by machine-readable instructions including a component that is the same as or similar to execution component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for using replay assets to automatically reach particular user game states in an online gaming platform, wherein user game states refer to sets of variables that define positions of users within the online gaming platform, wherein the positions include locations within a virtual space used in the online gaming platform, the system comprising:

one or more hardware processors configured by machine-readable instructions to:

manage user inventories for users of the online gaming platform, wherein the users include a first user and a second user, wherein the user inventories include a first account inventory associated with the first user and a second account inventory associated with the second user, wherein the first account inventory includes a replay asset that includes and/or refers to a set of executable in-game operations, wherein the replay asset is associated with an ownership indicator related to a current owner of the usage rights pertaining to the replay asset;

receive an indication of a transfer of the replay asset from the first account inventory to the second account inventory such that, subsequent to the transfer, the ownership indicator associated with the replay asset indicates the second user is the current owner of the usage rights pertaining to the replay asset;

receive a request, from the second user, for an activation of the replay asset by the second user, wherein the activation of the replay asset by the second user results in automated execution of the set of executable in-game operations on behalf of the second user such that a second particular current user game state for the second user is advanced to a second particular subsequent user game state for the second user, wherein the activation requires the ownership of the usage rights pertaining to the replay asset as indicated by the ownership indicator associated with the replay asset; and responsive to receipt of the request for the activation of the replay asset, execute the set of executable in-game operations automatically such that the second particular current user game state for the second user is advanced to the second particular subsequent user game state for the second user within the online gaming platform.

2. The system of claim 1, wherein automatically executing the set of executable in-game operations includes performing, within the online gaming platform, during an automation period, particular in-game actions by an in-game character associated with the second user, wherein the second user has control over other in-game actions performed by the in-game character before and after the automation period.

3. The system of claim 1, wherein the one or more hardware processors are further configured by machine-readable instructions to:

perform a first verification whether the second user has the ownership of the usage rights pertaining to the replay asset;

wherein automatically executing the set of executable in-game operations occurs responsive to the first verification verifying the second user has ownership of the usage rights pertaining to the replay asset.

4. The system of claim 3, wherein the one or more hardware processors are further configured by machine-readable instructions to:

register the replay asset on a distributed blockchain, and register the ownership indicator on the distributed blockchain.

5. The system of claim 4, wherein the first verification includes verifying whether the ownership indicator indicates the replay asset is owned by the second user.

6. The system of claim 4, wherein the transfer of the replay asset corresponds to a transaction that is registered on the distributed blockchain.

7. The system of claim 1, wherein the users of the online gaming platform include a third user, wherein the user inventories include a third account inventory associated with the third user;

wherein the one or more hardware processors are further configured by machine-readable instructions to:

receive information reflecting a sale of the replay asset to the third user, such that, subsequent to the sale of the replay asset to the third user, the replay asset has been added to the third account inventory;

receive a second request, from the third user, for a second activation of the replay asset by the third user, wherein the second activation of the replay asset by the third user results in a particular automated execution of the set of executable in-game operations on behalf of the third user; and perform the particular automated execution of the set of executable in-game operations such that a third particular current user game state for the third user is advanced to a third particular subsequent user game state for the third user within the online gaming platform.

8. The system of claim 1, wherein the one or more hardware processors are further configured by machine-readable instructions to:

create the set of executable in-game operations by the first user; and create the replay asset such that the replay asset includes and/or refers to the set of executable in-game operations.

9. A method for using replay assets to automatically reach particular user game states in an online gaming platform, wherein user game states refer to sets of variables that define positions of users within the online gaming platform, wherein the positions include locations within a virtual space used in the online gaming platform, the method comprising:

managing user inventories for users of the online gaming platform, wherein the users include a first user and a second user, wherein the user inventories include a first account inventory associated with the first user and a second account inventory associated with the second user, wherein the first account inventory includes a replay asset that includes and/or refers to a set of executable in-game operations, wherein the replay asset is associated with an ownership indicator related to a current owner of the usage rights pertaining to the replay asset;

receiving an indication of a transfer of the replay asset from the first account inventory to the second account inventory such that the ownership indicator associated with the replay asset indicates the second user is the current owner of the usage rights pertaining to the replay asset;

receiving a request, from the second user, for an activation of the replay asset by the second user, wherein the activation of the replay asset by the second user results in automated execution of the set of executable in-game operations on behalf of the second user such that a second particular current user game state for the second user is advanced to a second particular subsequent user game state for the second user, wherein the activation requires the ownership of the usage rights pertaining to the replay asset as indicated by the ownership indicator associated with the replay asset; and responsive to the activation of the replay asset, executing the set of executable in-game operations automatically such that the second particular current user game state for the second user is advanced to the second particular subsequent user game state for the second user within the online gaming platform.

10. The method of claim 9, wherein automatically executing the set of executable in-game operations includes performing, within the online gaming platform, during an automation period, particular in-game actions by an in-game character associated with the second user, wherein the second user has control over other in-game actions performed by the in-game character before and after the automation period.

11. The method of claim 9, further comprising:
performing a first verification whether the second user has the ownership of the usage rights pertaining to the replay asset;
wherein automatically executing the set of executable in-game operations occurs responsive to the first verification verifying the second user has ownership of the usage rights pertaining to the replay asset.

12. The method of claim 11, further comprising:
registering the replay asset on a distributed blockchain, and register the ownership indicator on the distributed blockchain.

13. The method of claim 12, wherein the first verification includes verifying whether the ownership indicator indicates the replay asset is owned by the second user.

14. The method of claim 12, wherein the transfer of the replay asset corresponds to a transaction that is registered on the distributed blockchain.

15. The method of claim 9, wherein the users of the online gaming platform include a third user, wherein the user inventories include a third account inventory associated with the third user, the method further comprising:
receiving information reflecting a sale of the replay asset to the third user, such that, subsequent to the sale of the replay asset to the third user, the replay asset has been added to the third account inventory;
receiving a second request, from the third user, for a second activation of the replay asset by the third user, wherein the second activation of the replay asset by the third user results in a particular automated execution of the set of executable in-game operations on behalf of the third user; and
performing the particular automated execution of the set of executable in-game operations such that a third particular current user game state for the third user is advanced to a third particular subsequent user game state for the third user within the online gaming platform.

16. The method of claim 9, further comprising:
creating the set of executable in-game operations by the first user; and
creating the replay asset such that the replay asset includes and/or refers to the set of executable in-game operations.

* * * * *